US007531936B2

(12) United States Patent
Fukasaku et al.

(10) Patent No.: US 7,531,936 B2
(45) Date of Patent: May 12, 2009

(54) STATOR CORE WITH COIL SLOT SKEWED RELATIVE TO STATOR CORE AXIS

(75) Inventors: Hiroshi Fukasaku, Kariya (JP); Minoru Mera, Kariya (JP); Tatsuya Horiba, Kariya (JP)

(73) Assignee: Kabushiki Kaisha Toyota Jidoshokki, Kariya-shi (JP)

( * ) Notice: Subject to any disclaimer, the term of this patent is extended or adjusted under 35 U.S.C. 154(b) by 400 days.

(21) Appl. No.: 11/440,255

(22) Filed: May 23, 2006

(65) Prior Publication Data

US 2006/0267443 A1 Nov. 30, 2006

(30) Foreign Application Priority Data

May 24, 2005 (JP) .......................... P2005-151137

(51) Int. Cl.
*H02K 1/00* (2006.01)

(52) U.S. Cl. ..................................................... 310/216

(58) Field of Classification Search ................. 310/216, 310/217, 218, 156.47, 156.12, 261, 156
See application file for complete search history.

(56) References Cited

U.S. PATENT DOCUMENTS

| | | | | |
|---|---|---|---|---|
| 5,760,520 | A * | 6/1998 | Hasebe et al. | 310/261 |
| 6,700,287 | B2 * | 3/2004 | Ohmura et al. | 310/217 |
| 6,897,588 | B2 * | 5/2005 | Okubo | 310/156.36 |
| 7,224,096 | B2 * | 5/2007 | Meacham et al. | 310/217 |
| 7,394,178 | B1 * | 7/2008 | Hsiung et al. | 310/156.12 |
| 7,397,159 | B2 * | 7/2008 | Yoshinaga | 310/156.47 |
| 2005/0017594 | A1 * | 1/2005 | Herp et al. | 310/218 |

FOREIGN PATENT DOCUMENTS

| | | |
|---|---|---|
| JP | 55-061260 | 5/1980 |
| JP | 57-183251 | 11/1982 |
| JP | 61-295847 | 12/1986 |
| JP | 05-115156 | 5/1993 |
| JP | 07-322577 | 12/1995 |
| JP | 11-225461 | 8/1999 |
| JP | 2001-008417 | 1/2001 |

* cited by examiner

*Primary Examiner*—Chandrika Prasad
(74) *Attorney, Agent, or Firm*—Locke Lord Bissell & Liddell, LLP

(57) ABSTRACT

A stator includes a cylindrical stator core and a coil. The stator core is formed by stacking a plurality of core sheets. The stator core has a groove formed in an outer circumferential surface thereof and a slot. The coil is inserted in the slot. The groove is located parallel to an axis of the stator core and the slot is skewed with respect to the axis.

9 Claims, 4 Drawing Sheets

FORMING A PLURALITY OF CORE SHEETS
STACKING THE CORE SHEETS
INSERTING A COIL INTO SLOTS
SKEWING THE SLOTS
FIXING THE CORE SHEETS
WELDING
WELDING 10
10'
10"
11
12
13
14
15
10a
10b
O10
L10
O10'
L10'
θ
O10"
L10"
2θ
12'
13'
14'
12"
13"
14"

STATOR CORE WITH COIL SLOT SKEWED RELATIVE TO STATOR CORE AXIS

BACKGROUND OF THE INVENTION

The present invention relates to a stator and a method of forming the stator.

A conventional stator for use in an electric motor and a method of forming the stator are disclosed by Japanese Unexamined Patent Application Publication (KOKAI) No. 2001-8417 wherein a plurality of core sheets having holes with concentric circles are stacked to form a stator core. Each core sheet has a plurality of recesses formed in the inner edge thereof thereby to form a plurality of slots in the inner circumferential surface of the stator core. The slots are in parallel with an axis of the stator core, in which a coil is inserted. Each core sheet also has a plurality of recesses formed in the outer edge thereof thereby to form a plurality of engaging grooves in the outer circumferential surface of the stator core. The engaging grooves are in parallel with the axis of the stator core, with which an engaging tool is engaged for skewing the slots. When the tool which is previously skewed is inserted into the engaging grooves and at the same time the grooves are inclined (or skewed) with respect to the axis of the stator core after the coil is inserted into the slots, each core sheet is rotated around the axis of the stator core thereby to skew the slots. Thus, the stator whose slots are skewed is formed.

However, since the outer circumferential surface of the stator core is a cylindrical surface, there has been a problem that it is troublesome to measure angle of inclination of the engaging grooves which are formed diagonally in the cylindrical surface. More specifically, since the width of the tool which is engaged with the grooves is smaller than those of the grooves, there exists play between the tool and the grooves in skewing the slots, so that the grooves may be waved. Since the slots have the coil inserted therein, skew angle of the slots is measured by putting a gauge in the grooves and measuring the angle of inclination of the grooves instead of measuring the skew angle directly. In this case, when the grooves are waved, the gauge is not put into the grooves. When the angle of inclination of the grooves is measured by image processing, the angle of inclination differs between points of measurement of each groove, so that it is troublesome to judge the skew angle.

In addition, the outer circumferential surface of the stator core is formed with fixation grooves for fixing the core sheets and alignment grooves for mounting the stator core on a housing of the electric motor as well as the engaging grooves with which the tool is engaged. When the slots are skewed, these grooves are also skewed. In this case, by so inclining the fixation grooves with respect to the axis of the stator core, when the core sheets are fixed by welding, torch needs to be diagonally moved, so that the cost of welding equipment is increased. Furthermore, by so inclining the alignment grooves with respect to the axis of the stator core, when the stator core is mounted on the housing of the electric motor by inserting pins into the alignment grooves to be aligned, it is troublesome to insert the pins into the alignment grooves, so that positioning accuracy deteriorates.

The present invention is directed to a stator of which fixed cost of a stator core and accuracy of skew angle of slots of the stator core are improved and a method of forming the stator.

SUMMARY OF THE INVENTION

A stator according to the present invention provides the following features. The stator includes a cylindrical stator core and a coil. The stator core is formed by stacking a plurality of core sheets. The stator core has a groove formed in an outer circumferential surface thereof and a slot. The coil is inserted in the slot. The groove is located parallel to an axis of the stator core and the slot is skewed with respect to the axis.

Also, a method of forming a stator according to the present invention provides the following first features. The stator has a cylindrical stator core and a coil. The stator core is formed by stacking a plurality of core sheets. The stator core has a groove formed in an outer circumferential surface thereof and a slot in which the coil is inserted. The method including the steps of: forming the core sheets each having a slot opening for forming the slot and a recess for forming the groove, in which the corresponding recesses of the core sheets for forming the same groove are stepwise shifted from each other by a predetermined angle with respect to the slot opening; stacking the core sheets so that the slot is located parallel to an axis of the stator core; inserting the coil into the slot; skewing the slot by rotating the core sheets so that the groove is located parallel to the axis of the stator core; and welding the core sheets using the groove to fix the core sheets.

Also, a method of forming a stator according to the present invention provides the following second features. The stator has a cylindrical stator core and a coil. The stator core is formed by stacking a plurality of core sheets. The stator core has a groove formed in an outer circumferential surface thereof and a slot in which the coil is inserted. The method including the steps of: forming the core sheets each having a slot opening for forming the slot and a recess for forming the groove, in which the corresponding recesses of the core sheets for forming the same groove are stepwise shifted from each other by a predetermined angle with respect to the slot opening; stacking the core sheets so that the groove is located parallel to an axis of the stator core; welding the core sheets using the groove to fix the core sheets; and inserting the coil into the slot.

Other aspects and advantages of the invention will become apparent from the following description, taken in conjunction with the accompanying drawings, illustrating by way of example the principles of the invention.

BRIEF DESCRIPTION OF THE DRAWINGS

The features of the present invention that are believed to be novel are set forth with particularity in the appended claims. The invention together with objects and advantages thereof, may best be understood by reference to the following description of the presently preferred embodiments together with the accompanying drawings in which:

DETAILED DESCRIPTION OF THE PREFERRED EMBODIMENTS

Figure 1:
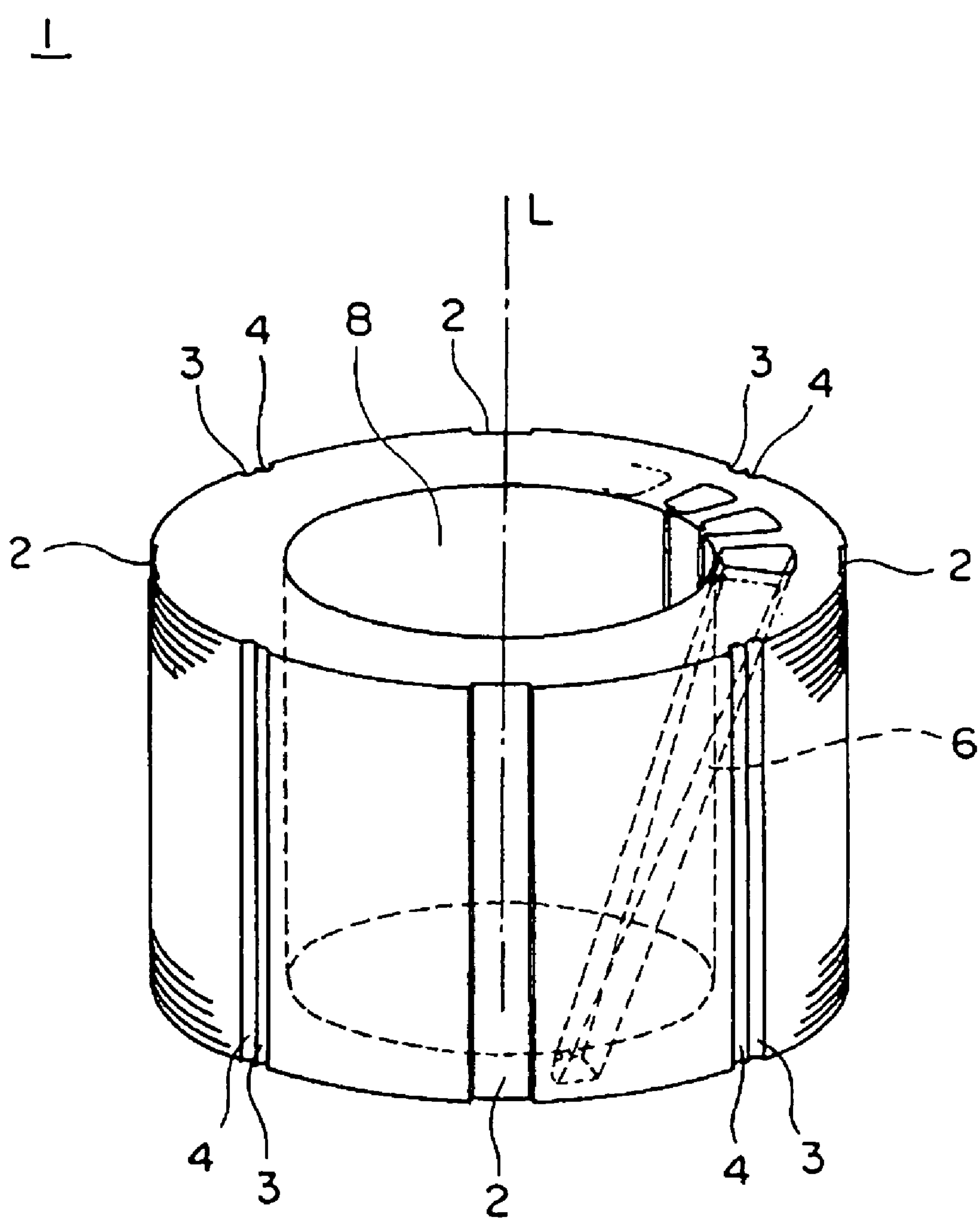
FIG. 1 is a perspective view showing a stator core according to a first embodiment of the present invention.
Figure 2:
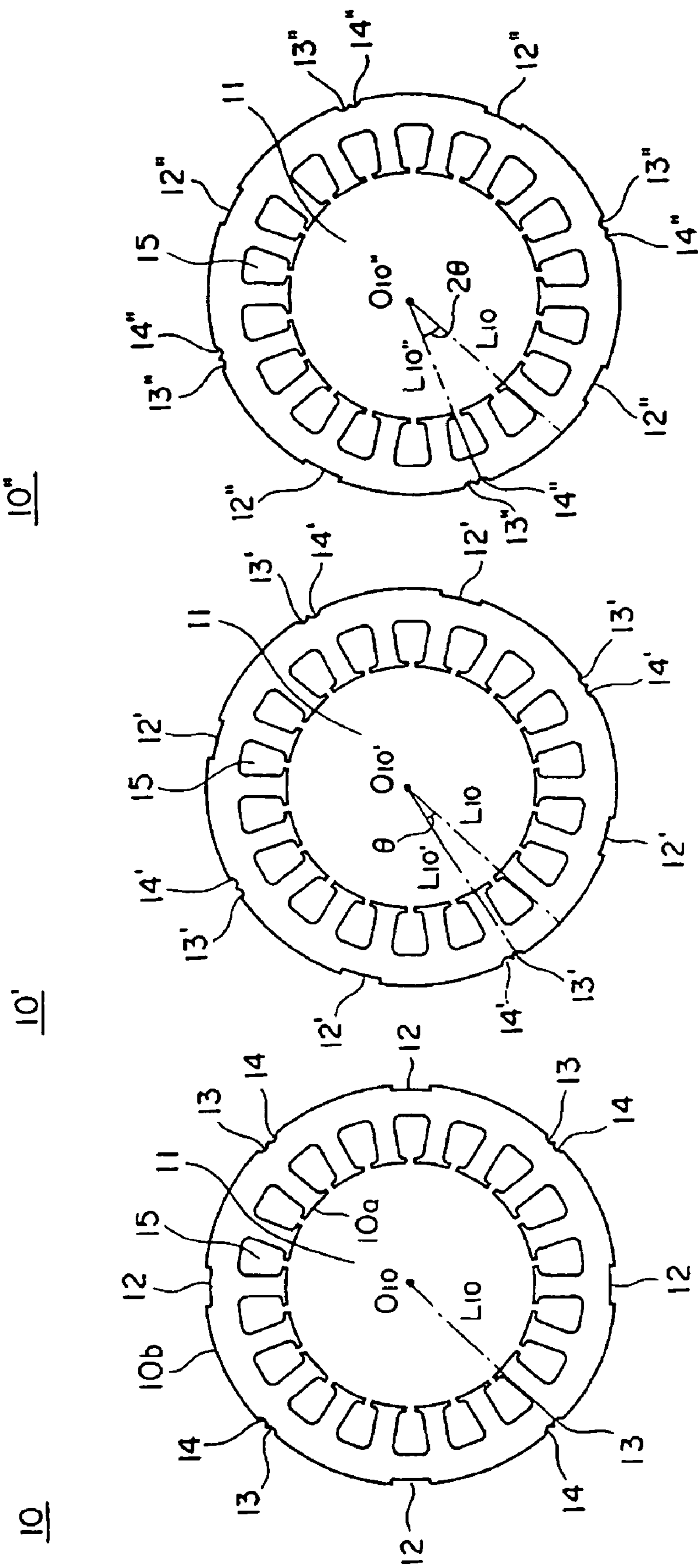
FIG. 2 is a plan view showing core sheets for forming the stator core according to the first embodiment.

The following will describe embodiments of the present invention with reference to the accompanying drawings. FIG. 1 shows a stator core of a stator of the first embodiment. The stator core 1 is formed of a cylindrical shape and has a hollow portion 8 formed of a cylindrical shape. The stator core 1 is concentric with the hollow portion 8. An alternate long and short line shows an axis L of the stator core 1. The stator core 1 is so formed that a plurality of core sheets each of which has a disc-like shape are stacked. Three of the core sheets are shown in FIG. 2 and are identified by reference numbers 10, 10' and 10". The core sheet 10 is formed of a disc-like shape and has a hole 11 concentrically. The core sheet 10 has an inner edge 10*a* and an outer edge 10*b* thereof. A plurality of slot openings 15 are equally spaced in the inner edge 10*a*. Four recesses 12 are equally spaced in the outer edge 10*b* in the circumferential direction thereof. Adjacent recesses 12, 12 have a pair of recesses 13, 14 in the middle thereof, which are adjacent to each other, and therefore, four pairs of the recesses 13, 14 are formed in the outer edge 10*b*. The core sheet 10' is so formed that the positions of the slot openings 15 are not changed from those of the core sheet 10 and the positions of the recesses 12, 13 and 14 formed in the outer edge 10*b* are shifted from those of the core sheet 10 in the circumferential direction of the outer edge 10*b* by equidistance to form recesses 12', 13' and 14'. Similarly, the core sheet 10" is so formed that the positions of the slot openings 15 are not changed from those of the core sheet 10' and the positions of the recesses 12', 13' and 14' are shifted from those of the core sheet 10' in the circumferential direction of the outer edge 10*b* by the same distance as the distance by which the positions of the recesses 12, 13 and 14 are shifted to those of the recesses 12', 13' and 14' to form recesses 12", 13" and 14". Although only three core sheets 10, 10' and 10" are shown in FIG. 2, there are actually number of core sheets needed for forming the stator core 1 (refer to FIG. 1). The positions of the corresponding recesses formed in the outer edges of the core sheets are stepwise shifted from each other in the circumferential direction of the outer edge by equidistance. That is, when the straight line which passes through the center $O_{10}$ of the core sheet 10 and the position of the recess 13 is identified by a reference number $L_{10}$ as shown in FIG. 2, the straight line $L_{10'}$ which passes through the center $O_{10'}$ of the core sheet 10' and the position of the recess 13' and the straight line $L_{10''}$ which passes through the center $O_{10''}$ of the core sheet 10" and the position of the recess 13" are shifted from the straight line $L_{10}$ by angles of θ and 2θ, respectively. Thus, the corresponding recesses formed in the outer edges of the core sheets for forming the same groove are stepwise shifted from each other with respect to the slot openings 15 formed in the inner edge of each core sheet by an angle of θ. It is noted that for the sake of explanatory convenience, the angle θ is more exaggeratedly shown in FIG. 2 than the actual angle.

The above core sheets 10, 10', 10" and the like are stacked to form the stator core 1 as shown in FIG. 1. The outer circumferential surface of the stator core 1 is formed with four engaging grooves 2, four fixation grooves 3 and four alignment grooves 4. The recesses 12 and the corresponding recesses 12', 12" and the like are aligned with each other to form the four engaging grooves 2. The recesses 13 and the corresponding recesses 13', 13" and the like are aligned with each other to form the four fixation grooves 3. The recesses 14 and the corresponding recesses 14', 14" and the like are aligned with each other to form the four alignment grooves 4. An engaging tool (not shown) is engaged with one of the engaging grooves 2 for skewing the core sheets. The fixation grooves 3 are used for fixing the stacked core sheets by welding. The alignment grooves 4 are used for positioning the stator core 1 in mounting the stator core 1 on a housing of a motor (not shown). The grooves 2, 3 and 4 are in parallel with the axis L of the stator core 1.

The inner circumferential surface of the stator core 1 is formed with a plurality of slots 6. The corresponding slot openings 15 of the core sheets are aligned with each other to form a plurality of slots 6. Each slot 6 is inclined or skewed at an angle (skew angle) with respect to the axis L. The inclination of the slot 6 results from the fact that the corresponding recesses of the core sheets for forming the same groove are stepwise shifted from each other by a predetermined angle with respect to the slot openings 15. That is, although the grooves 2, 3 and 4 formed in the outer circumferential surface are inclined with respect to the axis L by stacking the core sheets so as to align the slot openings 15, the slots 6 formed by aligning the corresponding slot openings 15 are inclined with respect to the axis L by locating the three grooves parallel to the axis L. Therefore, the skew angle is adjustable by changing the angle θ by which the corresponding recesses formed in the outer edges of the core sheets for forming the same groove are stepwise shifted from each other with respect to the slot openings 15 formed in the inner edges. A coil (not shown) is inserted into the slots 6 of the stator core 1 thereby to form the stator.

Figure 3:
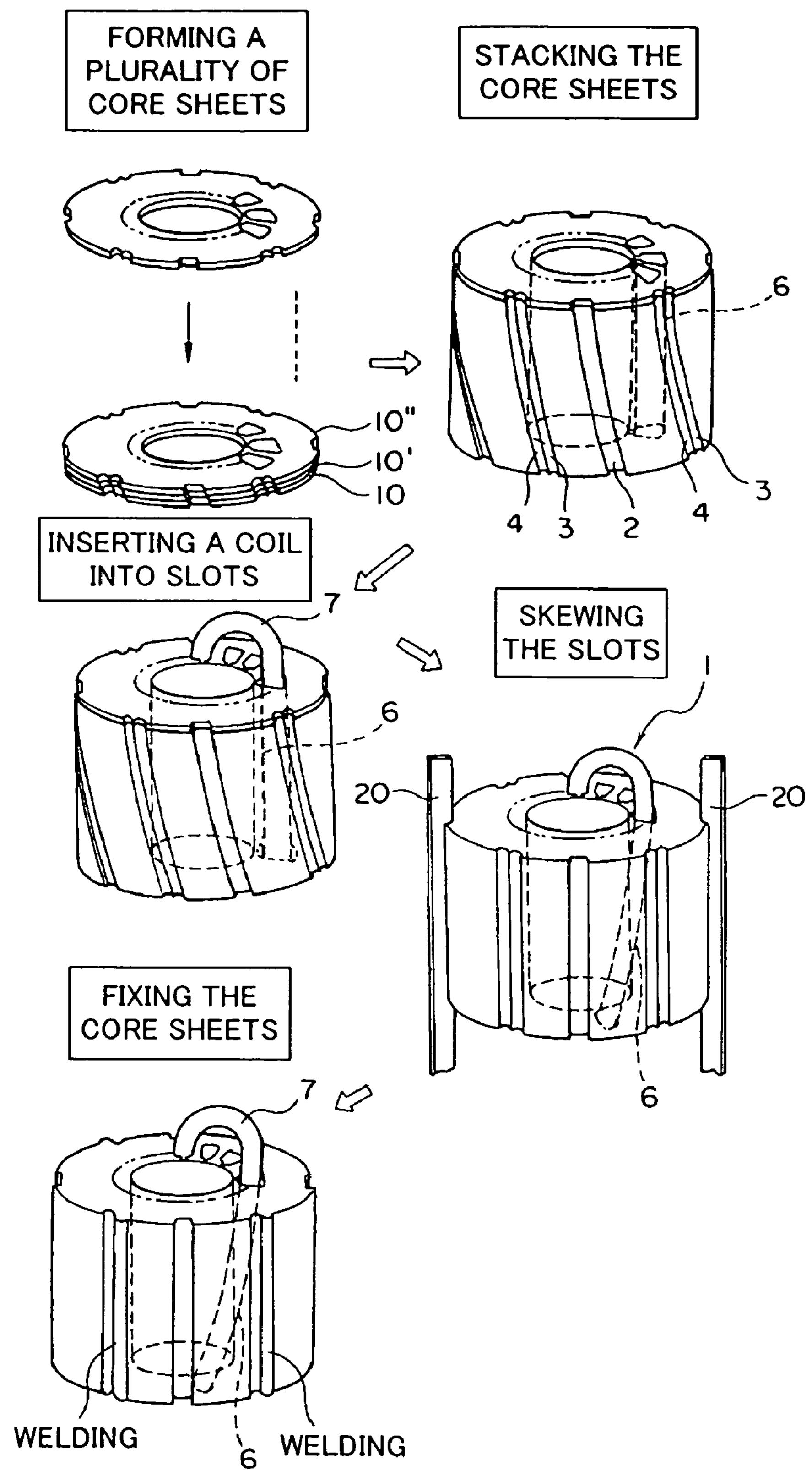
FIG. 3 is a diagram explaining a method of forming a stator according to the first embodiment.

A method of forming the stator according to the first embodiment will now be described with reference to FIG. 3. First of all, a plurality of core sheets 10', 10" and the like in which the corresponding recesses formed in the outer edges of the core sheets for forming the same groove are stepwise shifted from each other with respect to the slot openings 15 formed in the inner edges by a predetermined angle are pressed into shapes so as to be stacked. At this time, the core sheets are stacked so that the slots 6 which lie lengthwise in the inner circumferential surface of the core sheets are located parallel to the axis L. Thus, the grooves 2, 3 and 4 formed in the inner circumferential surface of the core sheets are equiangularly inclined with respect to the axis L. Then, a coil 7 is inserted into the slots 6. Since the slots 6 are in parallel with the axis L, the coil 7 is inserted into the slots 6 in a normal manner. Subsequently, an engaging tool 20 is engaged with the engaging groove 2 for skewing the core sheets. The core sheets are rotated around the axis L by the engaging tool 20 so that the grooves 2 are located parallel to the axis L, that is, the grooves 3 and 4 which are in parallel with the groove 2 are also located parallel to the axis L. Thus, the slots 6 are skewed by the skew angle caused by the angle θ by which the corresponding recesses for forming the same groove are shifted from each other with respect to the slot openings 15. Thereafter, the core sheets are welded and fixed so that padding is performed along the fixation groove 3, thereby to form the stator core.

As described above, a plurality of core sheets are formed so as to stepwise shift the corresponding recesses formed in the outer edges of the core sheets for forming the same groove from each other with respect to the slot openings 15 formed in the inner edges by a predetermined angle, and the core sheets are stacked so that the slots 6 are located parallel to the axis L, and the coil 7 is inserted into the slots 6. In this state, the slots 6 are skewed so that the grooves 2, 3 and 4 are located parallel to the axis L. This causes the grooves 2, 3 and 4 to be aligned without wave, thereby to skew the slots 6 without wave. Therefore, accuracy of the skew angle of the slots 6 is improved. In addition, when parallelism of the grooves 2, 3 and 4 with respect to the axis L of the stator core 1 is measured, the skew angle of the slots 6 is easily controlled compared to the conventional case where the skew angle of the grooves of the outer peripheral surface of the stator core was measured. Furthermore, since the fixation grooves 3 are located parallel to the axis L, the torch is moved vertically upon welding, which prevents cost rise of welding equipment. Furthermore, since the alignment grooves 4 are located parallel to the axis L, a positioning pin can be easily inserted into the alignment groove 4 in mounting the stator on the motor housing (not shown), which improves positioning accuracy.

Figure 4:
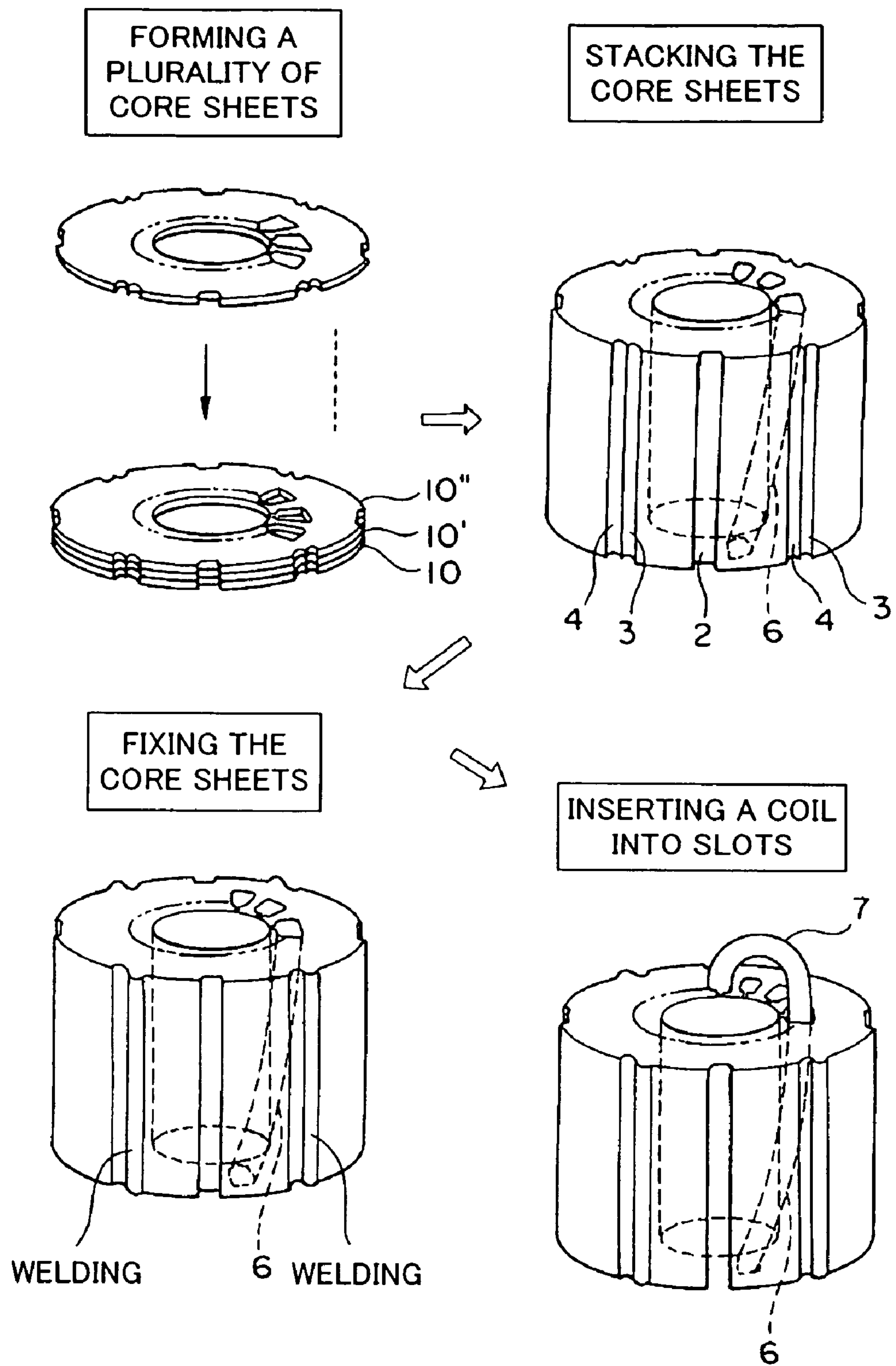
FIG. 4 is a diagram explaining a method of forming a stator according to a second embodiment.

A stator according to the second embodiment of the present invention will now be described. Since the same reference numerals of FIGS. 1 through 3 are substantially the same components in the second embodiment, detailed description thereof is omitted. A method of forming the stator according to the second embodiment is a modification of that of the first embodiment. The method of forming the stator according to the second embodiment will now be described with reference to FIG. 4. First of all, a plurality of core sheets 10', 10" and the like in which the corresponding recesses formed in the outer edges of the core sheets for forming the same groove are stepwise shifted from each other with respect to the slot openings 15 formed in the inner edges by a predetermined angle are pressed into shapes so as to be stacked. At this time, the core sheets are stacked so that the grooves 2,3 and 4 are located parallel to the axis L. Thus, the slots 6 are formed in a skewed state. Then, the core sheets are welded and fixed so that padding is performed along the fixation groove 3. Subsequently, the coil 7 is inserted into the slots 6 thereby to form the stator.

As described above, since the slots 6 are formed in a skewed state in stacking the core sheets, special operation and device for skewing the core sheets are not needed. Since welding for fixing the core sheets is performed before the coil 7 is inserted into the slots 6, cooling of the coil 7 needed upon welding is not needed and at the same time it is prevented that the coil 7 is affected by heat caused by welding. Since the stator formed by the method of the second embodiment is the same as the stator formed by the method of the first embodiment, the stator of the second embodiment has the same effect as that of the first embodiment.

Therefore, the present examples and embodiments are to be considered as illustrative and not restrictive, and the invention is not to be limited to the details given herein but may be modified within the scope of the appended claims.

What is claimed is:

1. A stator comprising:

a cylindrical stator core, formed by stacking a plurality of core sheets, having a groove formed in an outer circumferential surface thereof and a slot configured to receive a coil, wherein the groove is aligned in parallel to an axis of the cylindrical stator core and the slot is skewed with respect to the axis of the cylindrical stator core, and wherein the coil is inserted into the slot.

2. The stator according to claim 1, wherein the number of the slots and/or the number of the grooves are plural.

3. The stator according to claim 1, wherein the groove is used for skewing the core sheets.

4. The stator according to claim 1, wherein the groove is used for fixing the stacked core sheets by welding.

5. A method of forming a stator having a cylindrical stator core and a coil, the stator core being formed by stacking a plurality of core sheets, the stator core having a groove formed in an outer circumferential surface thereof and a slot in which the coil is inserted, comprising the steps of:

forming the core sheets each having a slot opening for forming the slot and a recess for forming the groove, in which the corresponding recesses of the core sheets for forming the same groove are stepwise shifted from each other by a predetermined angle with respect to the slot opening; stacking the core sheets so that the slot is located parallel to an axis of the stator core; inserting the coil into the slot;

skewing the slot by rotating the core sheets so that the groove is located parallel to the axis of the stator core; and welding the core sheets using the groove to fix the core sheets.

6. The method according to claim 5, wherein the number of the slots and/or the number of the grooves are plural.

7. A method of forming a stator having a cylindrical stator core and a coil, the stator core being formed by stacking a plurality of core sheets, the stator core having a groove formed in an outer circumferential surface thereof and a slot in which the coil is inserted, comprising the steps of:

forming the core sheets each having a slot opening for forming the slot and a recess for forming the groove, in which the corresponding recesses of the core sheets for forming the same groove are stepwise shifted from each other by a predetermined angle with respect to the slot opening;

stacking the core sheets so that the groove is located parallel to an axis of the stator core;

welding the core sheets using the groove to fix the core sheets; and inserting the coil into the slot.

8. The method according to claim 7, the number of the slots and/or the number of the grooves are plural.

9. The stator according to claim 1, wherein the slot is formed in an inner circumferential surface of the stator core.

* * * * *